United States Patent
Kimura

(10) Patent No.: US 8,649,031 B2
(45) Date of Patent: Feb. 11, 2014

(54) IMAGE READING CONTROL DEVICE, IMAGE FORMING APPARATUS, AND IMAGE DATA PROCESSING METHOD FOR SETTING PROCESSING ITEMS WHILE PREVIEWING AN IMAGE

(75) Inventor: Kouichi Kimura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 209 days.

(21) Appl. No.: 13/302,389

(22) Filed: Nov. 22, 2011

(65) Prior Publication Data

US 2012/0133978 A1    May 31, 2012

(30) Foreign Application Priority Data

Nov. 29, 2010    (JP) ................................. 2010-264528

(51) Int. Cl.
*G06F 3/12*    (2006.01)
*G06K 15/00*    (2006.01)
*G03G 15/00*    (2006.01)
*H04N 1/00*    (2006.01)

(52) U.S. Cl.
CPC .................................. *H04N 1/0044* (2013.01)
USPC ....... 358/1.13; 358/1.16; 358/1.17; 358/1.18; 399/81

(58) Field of Classification Search
CPC .................................................... H04N 1/0044

USPC .......................... 358/1.13, 1.16–1.18; 399/81
See application file for complete search history.

(56) References Cited

U.S. PATENT DOCUMENTS

2004/0036901 A1* 2/2004 Nakane ......................... 358/1.13
2008/0030818 A1* 2/2008 Nagahara et al. ............. 358/537

FOREIGN PATENT DOCUMENTS

JP    2005-45295 A    2/2005

\* cited by examiner

*Primary Examiner* — Fred Guillermety

(57) ABSTRACT

An image reading control device includes: an original reading unit; a display unit that can display an item selection window including processing items for the image data for each page and a processing condition setting window including a preview image based on the image data for each page thus read, at least one predetermined processing item, and contents for each of the at least one predetermined processing item; an input unit accepting a selection input of the processing items and a setting input for setting contents for each of the at least one predetermined processing item; and a reading control unit displaying the processing condition setting window on the display unit with the processing item selected in the selection input accepted by the input unit as the predetermined processing item, and controlling acceptance of the setting input in the input unit for setting contents for each predetermined processing item.

9 Claims, 5 Drawing Sheets

IMAGE READING CONTROL DEVICE, IMAGE FORMING APPARATUS, AND IMAGE DATA PROCESSING METHOD FOR SETTING PROCESSING ITEMS WHILE PREVIEWING AN IMAGE

This application is based on and claims the benefit of priority from Japanese Patent Application No. 2010-264528, filed on 29 Nov. 2010, the content of which is incorporated herein by reference.

BACKGROUND OF THE DISCLOSURE

1. Field of the Disclosure

The present disclosure relates to an image reading control device, an image forming apparatus, and an image data processing method.

2. Related Art

Conventionally, an image forming apparatus is well known that performs printing by: forming a latent image on a surface of a rotational photoreceptor based on image data read by irradiating an original with light; forming a toner image from the latent image with a toner supplied from a toner cassette; and transferring the toner image to paper being fed, followed by heat-fusing the transferred toner in a heat-fusing unit.

In addition, there is an image forming apparatus having image processing such as a function of coloring of respective pages (color printing), a negative image function, a combine function, a mirror image function and the like.

For example, as Related Art 1, a color image forming apparatus for printing image data read by a color original reading function on printing paper by a color printing function is known, which is provided with a predetermined editing function for reading a color original with a target color specified for each page, managing the image data for each page with the specified color, and if an editing operation is specified, printing a target page in the specified color corresponding to the image data.

However, the above-described image forming apparatus as Related Art 1 is configured such that the target color is specified for each page before a reading operation, not after the reading operation.

Here, there is a demand for making processing settings for each page after reading image data from an original, while previewing the image data, in a single printing job. In addition, in a configuration in which a processing item for image data is specified before the reading operation of an original, all the processing items must be displayed on a display unit but it is often difficult to display all the processing items in the display unit in a limited space. Such an inconvenience needs to be solved.

SUMMARY OF THE DISCLOSURE

An objective of the present disclosure is to provide an image reading control device, an image forming apparatus and an image data processing method that allow setting of processing items while previewing an image for each page, by effectively using a limited space of a display unit.

The present disclosure relates to an image reading control device including: an original reading unit that optically reads an image of an original, page by page, and obtains image data, a display unit that can display an item selection window including processing items for the image data for each page and a processing condition setting window including a preview image based on the image data for each page thus read, at least one predetermined processing item, and contents for each of the at least one predetermined processing item, an input unit that accepts a selection input of the processing items in a state in which the display unit displays the item selection window and accepts a setting input for setting contents for each of the at least one predetermined processing item in a state in which the display unit displays the processing condition setting window, a reading control unit that displays the item selection window on the display unit, controls acceptance of the selection input for the processing items in the input unit, displays the processing condition setting window on the display unit with the processing item selected in the selection input accepted by the input unit as the predetermined processing item, and controls acceptance of the setting input in the input unit for setting contents for each predetermined processing item, and an image processing unit that performs image processing on the image data obtained by the image reading unit, page by page, based on setting contents made in the setting input.

The present disclosure also relates to an image forming apparatus including, an image reading control device including, an original reading unit that optically reads an image of an original, page by page, and obtains image data, a display unit that can display an item selection window including processing items for the image data for each page, and a processing condition setting window including a preview image based on the image data for each page thus read, at least one predetermined processing item, and contents for each of the at least one predetermined processing item; an input unit that accepts a selection input of the processing items in a state in which the display unit displays the item selection window, and accepts a setting input for setting contents for each of the at least one predetermined processing item in a state in which the display unit displays the processing condition setting window; a reading control unit that displays the item selection window on the display unit, controls acceptance of the selection input for the processing items in the input unit, displays the processing condition setting window on the display unit with the processing item selected in the selection input accepted by the input unit as the predetermined processing item, and controls acceptance of the setting input in the input unit for setting contents for each predetermined processing item, and an image processing unit that performs image processing on the image data obtained by the image reading unit, page by page, based on setting contents made in the setting input, and an image forming unit that forms an image based on the image data processed by the image processing unit.

The present disclosure also relates to an image data processing method by which an image forming apparatus processes image data obtained, including, an original reading step in which the image forming apparatus optically reads an image of an original, page by page, and obtains image data, an item selection window displaying step in which the image forming apparatus displays an item selection window including processing items for the image data for each page, a selection input accepting step in which the image forming apparatus accepts a selection input of the processing item in a state of displaying the item selection window, a processing condition setting window displaying step in which the image forming apparatus displays a processing condition setting window including a preview image based on the image data for each page thus read, at least one predetermined processing item selected in the selection input accepting step, and contents for each of the at least one predetermined processing item, a setting input accepting step in which the image forming apparatus accepts a setting input for setting contents for each of the at least one predetermined processing item in a state of displaying the processing condition setting window, and an image processing step in which the image forming apparatus performs image processing on the image data, page by page, based on setting input contents in the setting input accepting step.

DETAILED DESCRIPTION OF THE DISCLOSURE

An embodiment of the image reading control device, the image forming apparatus and the image data processing method according to the present disclosure is described hereinafter with reference to the drawings. The image reading control device and the image data processing method are described in a description of the image forming apparatus according to the present disclosure.

Figure 1:
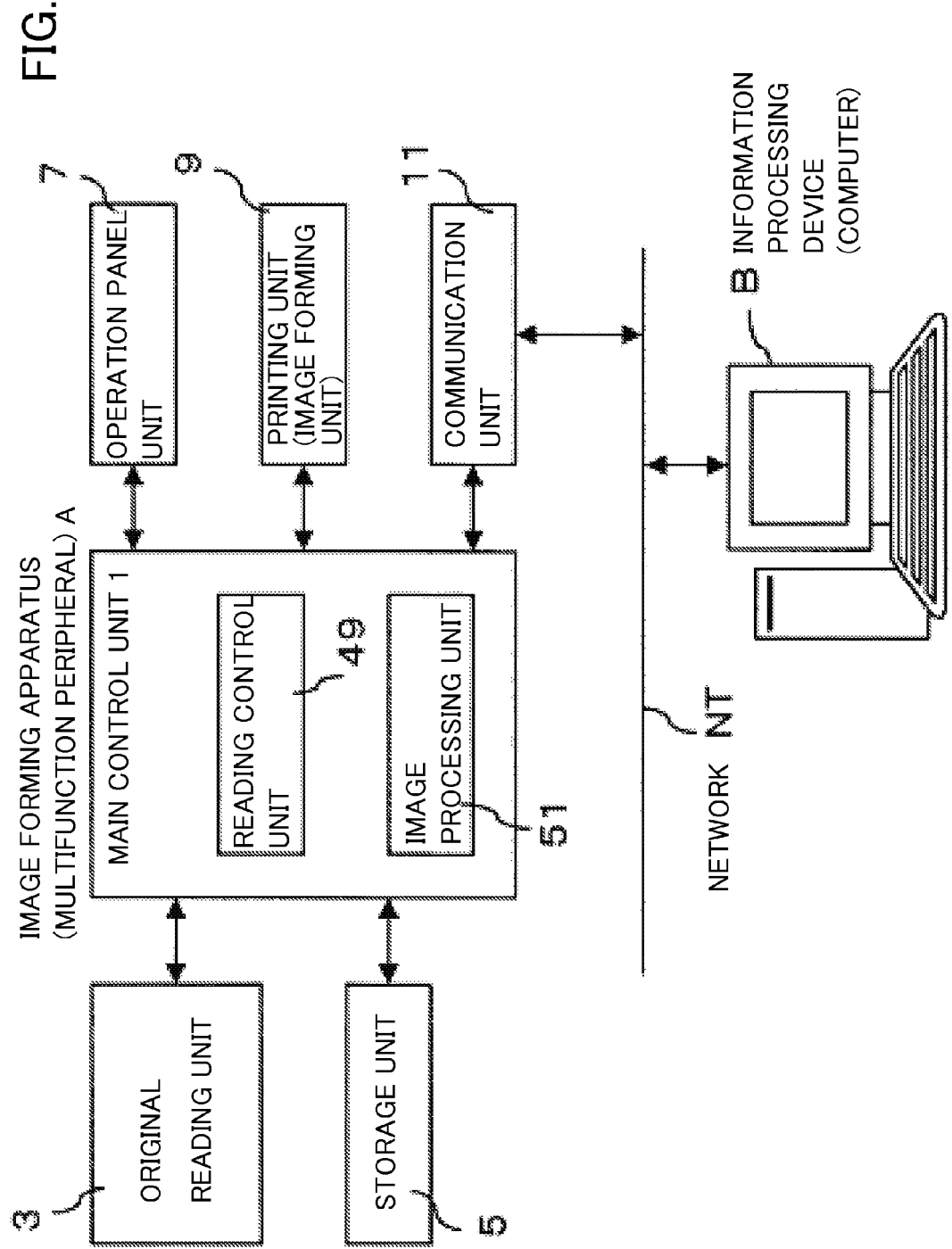
FIG. 1 is a block diagram illustrating an embodiment of an image forming apparatus including an image reading control device.

FIG. 1 is a block diagram illustrating an embodiment of an image forming apparatus A.

The image forming apparatus A includes a main control unit 1, an image reading unit 3, a storage unit 5, an operation panel unit 7, a printing unit 9 and a communication unit 11. The image forming apparatus A constitutes a multi-function peripheral (MFP), for example. The image forming apparatus A also constitutes a black-and-white copy machine, a color copy machine and the like; however, a description and illustration thereof is omitted since this is not an essential point of the present disclosure.

As described later, the original reading unit 3 is a full-color scanner that optically reads a surface image of an original 13, which is automatically fed, and generates electrical image data. The image data for each page thus generated by the original reading unit 3 is stored in the storage unit 5, under control of the main control unit 1. The original reading unit 3 is described later in detail.

The storage unit 5 stores read image data from the original reading unit 3, received image data (described later) from the communication unit 11, and a selected processing item (described later), under control of the main control unit 1. The storage unit 5 also stores an operation program for the main control unit 1. The storage unit 5 is composed of, for example, a readable/writable medium such as a hard disk.

Figure 2:
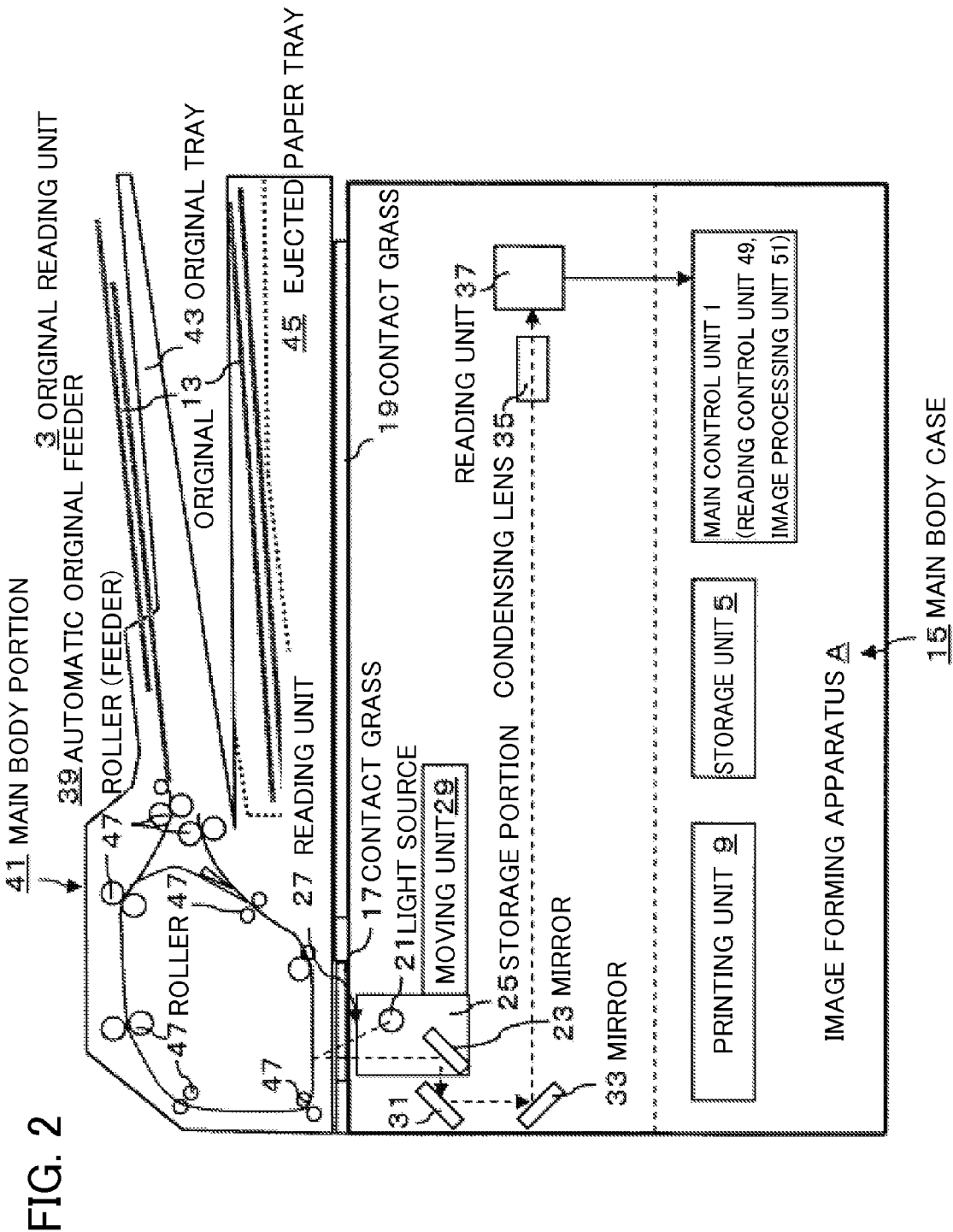
FIG. 2 is a configuration diagram illustrating major constituents of the image reading control device.

The operation panel unit 7 is disposed in an upper portion of a main body case 15 shown in FIG. 2 (not illustrated in FIG. 2). The operation panel unit 7 has a function as a display unit that can display various operational states, and a function as an input unit such as a touch switch that accepts an operation instruction for the apparatus, under control of the main control unit 1.

Figure 3:
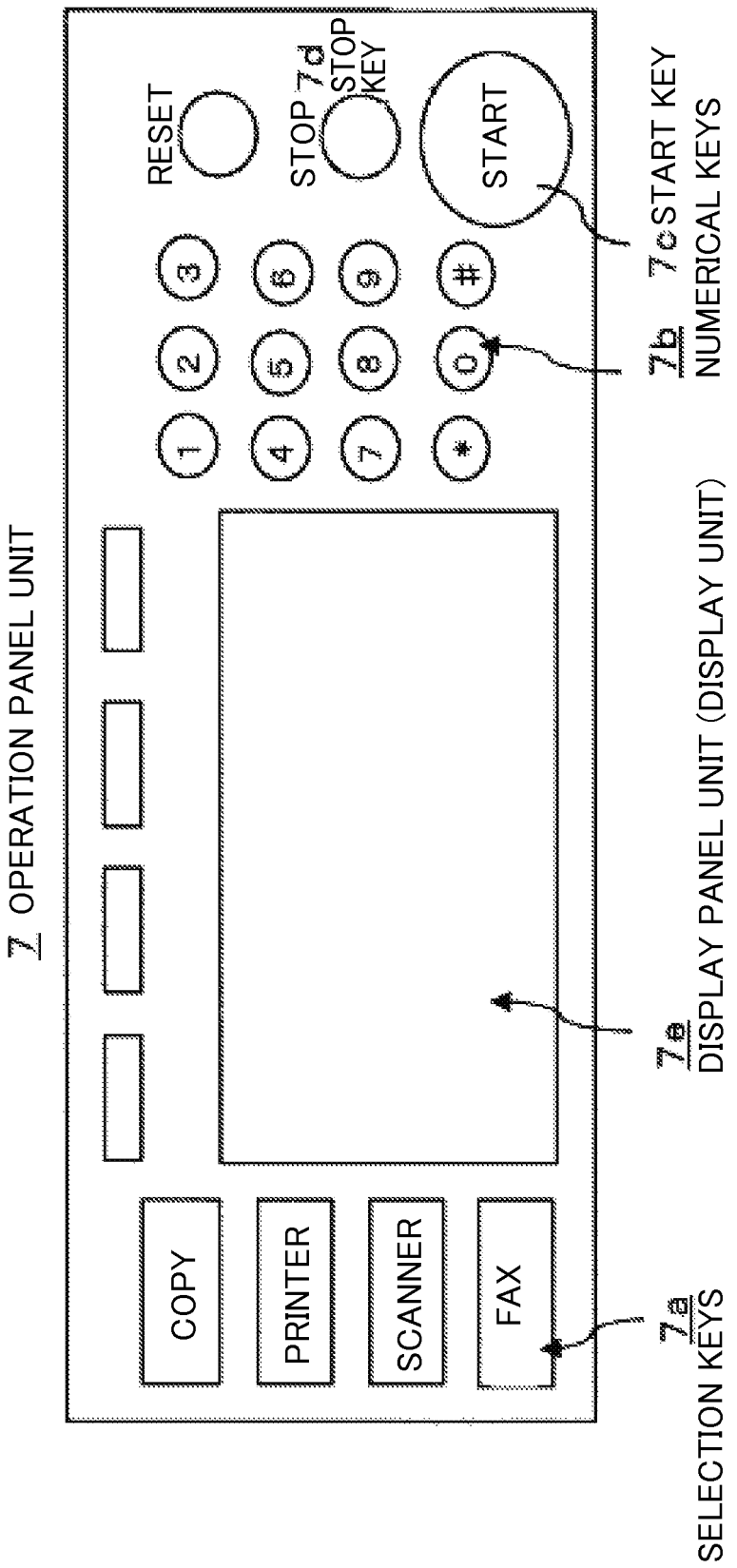
FIG. 3 is a diagram illustrating an operation panel unit of the image forming apparatus.

The operation panel unit 7 includes, for example as illustrated in FIG. 3: selection keys 7a for making various operation instructions and selections such as a printing (copy) process, a printer process, a scanner process, a facsimile transmission process and the like; conventionally known keys for inputting a setting change for setting items for the above-mentioned processes, such as numerical keys 7b, a start key 7c, a stop key 7d, a display panel unit 7e composed of a conventionally known liquid crystal display panel for displaying operation state of the apparatus, and the like.

The display panel unit 7e is composed of, for example, a touch screen. In this case, the display panel unit 7e is configured to include a display unit that displays windows and a touch sensor that is disposed on a display surface side of the display unit. The display panel unit 7e is configured to be able to detect a touch operation (a selection operation of an item and the like) by a user on the display panel unit 7e.

In addition to display of the operation state of the apparatus, the display panel unit 7e has a function of displaying an item selection window including processing items for image data for each page and a processing condition setting window including a preview image based on the image data for each page thus read, at least one predetermined (selected) processing item, and contents for each of the at least one predetermined processing item.

Figure 4A:
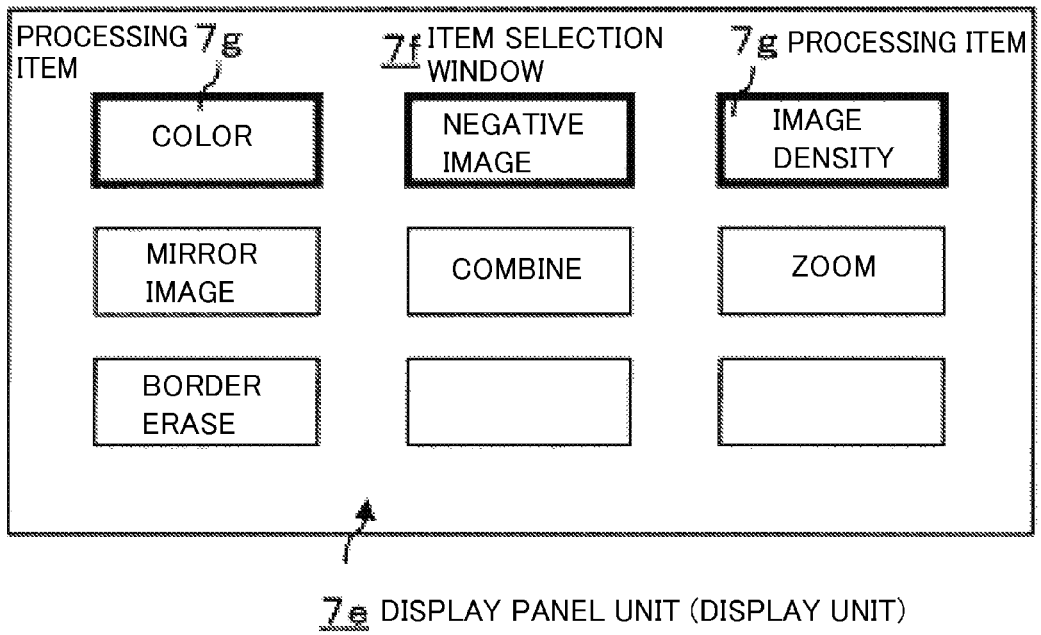
FIG. 4 is a diagram illustrating operation of the image reading control device.

As shown in FIG. 4A, the display panel unit 7e can display, as an item selection window 7f, a list of a plurality of processing items 7g for image data for each page, under control of the main control unit 1.

In FIG. 4A, as the processing items 7g: a color button for setting coloring; a negative image button for setting negative image; an image density button for setting image density; a mirror image button for setting a mirror image; a combine button for setting a combination; a zoom button for setting zooming; a border erase button for setting border erasure are displayed, for example.

The display panel unit 7e includes a transparent touch switch sheet (touch sensor, not visible in the drawing) as the input unit covering a surface thereof, and has a function of accepting selection input to each button of the processing items displayed. By performing a touch operation on any of the buttons (selection input) in the display panel unit 7e, and performing an operation on the start key 7c for example, a selection is accepted (confirmed). Selection information thereof is output to the main control unit 1.

Figure 4B:
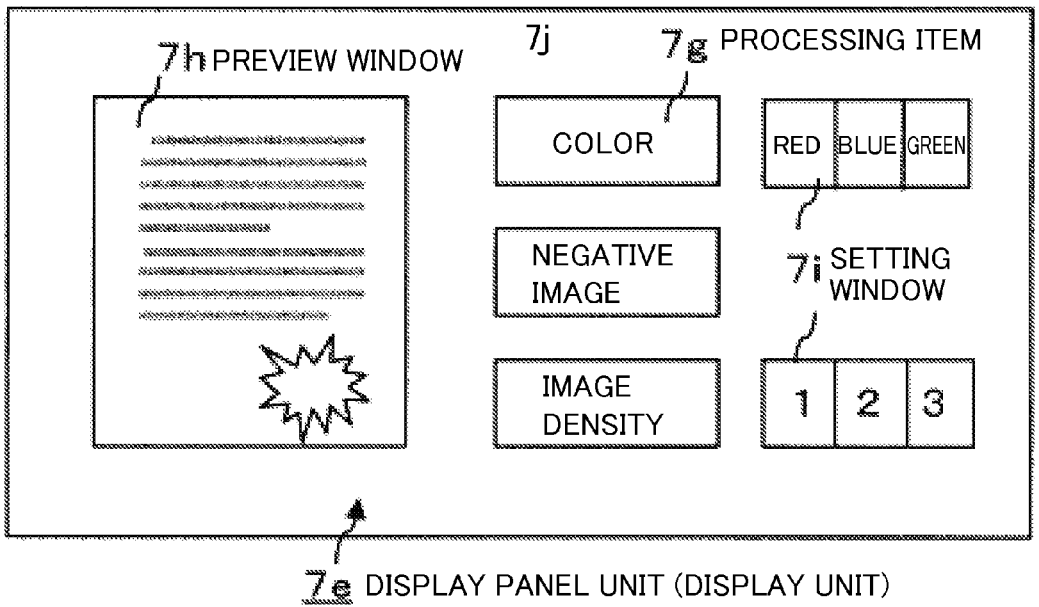

As shown in FIG. 4B, the display panel unit 7e also displays, as the processing condition setting window 7j, a preview image based on the image data for each page thus read, at least one predetermined (selected) processing item, and a setting window for setting contents for each of the at least one predetermined processing item, under control of the main control unit 1.

More specifically, the display panel unit 7e displays: a preview window 7h based on the image data for each page; the color button, the negative image button and the image density button as the selected processing items 7g; and a setting window 7i displaying setting contents thereof.

After performing a touch operation (selection input) on the of the predetermined area of the touch switch sheet covering the surface of the display panel unit 7e, corresponding to the processing items 7g and the setting window 7i, the selection input is accepted (confirmed) by an operation on the start key 7c, for example. Setting information thereof is then output to the main control unit 1.

The printing unit 9 is a full-color printing engine as the image forming unit, disposed in the main body case 15 shown in FIG. 2 and is provided with (not illustrated): a plurality of paper feeding parts in which the paper is set; a transfer unit (rotational photoreceptor) that converts the image data to printing image data, develops the image data with the toner from toner cassettes, and transfers a toner image to the paper; a fusing unit that heat-fuses the transferred image on the paper; and the like.

The communication unit 11 of FIG. 1 is an interface unit that transmits and receives various image data and the like according to a predetermined protocol, with respect to an information processing device B such as computer via a network NT.

The main control unit 1 is configured to include a CPU, ROM storing operation programs for the CPU and work RAM (not illustrated), and to control the original reading unit 3, the storage unit 5, the operation panel unit 7, the printing unit 9, the communication unit 11, non-illustrated functional units of the image forming apparatus A, and the like. Other functions thereof are described later.

Next, the original reading unit 3 is described with reference to FIG. 2.

In FIG. 2, transparent contact glass 17 and 19 are placed above the main body case 15. The contact glass 17 has an elongated rectangular shape and is disposed to be aligned with a side of the main body case 15 along a main scanning direction of an original 13 to be read (a direction orthogonal to a feeding direction of the original).

The contact glass 19 has a rectangular shape larger than the original 13 and is disposed to extend from the vicinity of the contact glass 17 in an opposite direction to the contact glass 17.

In the main body case 15, immediately below the vicinity of the contact glass 17 there is formed: a reading unit 27 that is configured to include a storage portion 25 that stores: a linear light source 21 composed of light emitting diodes or the like, for example, that emits light toward the original 13 placed on the contact glass 17, a mirror 23 that reflects reflected light from the contact glass 17, and.

The reading unit 27 is connected to a moving unit 29 disposed inside the main body case 15 and moves intermittently at predetermined timing and parallel to the contact glass 19, starting from immediately below the vicinity of the contact glass 17 to a right end of the drawing. Reciprocation of the reading unit 27 is controlled by the moving unit 29 so as to return to a starting point upon reaching an end point. The moving unit 29 is controlled by the reading control unit 49 (described later).

The moving unit 29 controls reciprocation of the reading unit 27 when an automatic original feeder 39 (described later) does not operate.

In the main body case 15, mirrors 31, 33, a condensing lens 35 and a reading portion 37 are disposed on a light axis of the reflected light from the mirror 23, thereby constituting an optical system.

Based on reflected light from the reading unit 27, which is bent and guided by the mirrors 31, 33 and then condensed by the condensing lens 35, the reading portion 37 outputs image data converted to a digital signal of a level corresponding to a light intensity of the reflected light to the storage unit 5 via the main control unit 1. The reading portion 37 is composed of, for example, a CCD line sensor.

On the main body case 15, the automatic original feeder 39 is disposed so as to cover the contact glasses 17, 19. An end of the automatic original feeder 39 is pivotally connected to the main body case 15 by means of a hinge mechanism (not illustrated).

A main part 41 of the automatic original feeder 39 is positioned above the contact glass 17, and an original tray 43 and an ejected paper tray 45 that are extending from the main part 41 are positioned above the contact glass 19.

In the main part 41 of the automatic original feeder 39, a plurality of feeding rollers 47 is disposed as the moving unit that dispatches the original 13 from the original tray 43, feeds the original 13 in a looped manner via the vicinity of the reading unit 27, and ejects the original 13 to the ejected paper tray 45.

Rotation of the plurality of feeding rollers 47 is controlled by the reading control unit 49 (described later).

The above-described functions of the main control unit 1 are further described with reference to FIG. 2.

In addition to the above-described functions, the main control unit 1 has functions as the reading control unit 49 and an image processing unit 51.

In other words, the reading control unit 49 has a function of controlling the original reading unit 3 to read the original 13 page by page and to stop reading the original 13, based on the instruction input from the start key 7c and the stop key 7d.

The reading control unit 49 displays the item selection window 7f on the display panel unit 7e and controls acceptance of selection input of the processing item 7g on the operation panel 7 (display panel unit 7e).

In addition, the reading control unit 49 accepts the processing item 7g selected by selection input on the operation panel 7 (display panel unit 7e) as the predetermined processing item, and displays the processing condition setting window 7j including the processing item 7g thus selected, on the display panel unit 7e. Furthermore, in a state in which the processing condition setting window 7j is displayed on the display panel unit 7e, the reading control unit 49 controls acceptance of the setting input for setting of contents of each processing item 7g on the operation panel 7 (display panel unit 7e).

Moreover, the reading control unit 49 controls the storage unit 5 to store the processing item thus selected, and controls the original reading unit 3 (the moving unit 29 and the automatic original feeder 39) to read a surface image of the original page by page, by outputting a reading instruction.

The reading control unit 49 also has a function of controlling the original reading unit 3 to read a subsequent page by outputting the reading instruction to the original reading unit 3, upon acceptance (confirmation) of setting of contents of the processing item regarding the image data for each page through the operation panel 7 (display panel unit 7e).

The image processing unit 51 performs processing such as various filter processing operation and the like with respect to the digital image data generated by the original reading unit 3. The image processing unit 51 has a function of, if the processing item is set for each page, processing the image data thus read with the setting content of the processing item, and outputting the image data thus processed to the storage unit 5 via the main control unit 1.

The image data stored in the storage unit 5 is read and output to the printing unit 9 under control of the main control unit 1. The printing unit 9 prints an image (forms an image) on the paper based on the (processed) image data.

Figure 5:
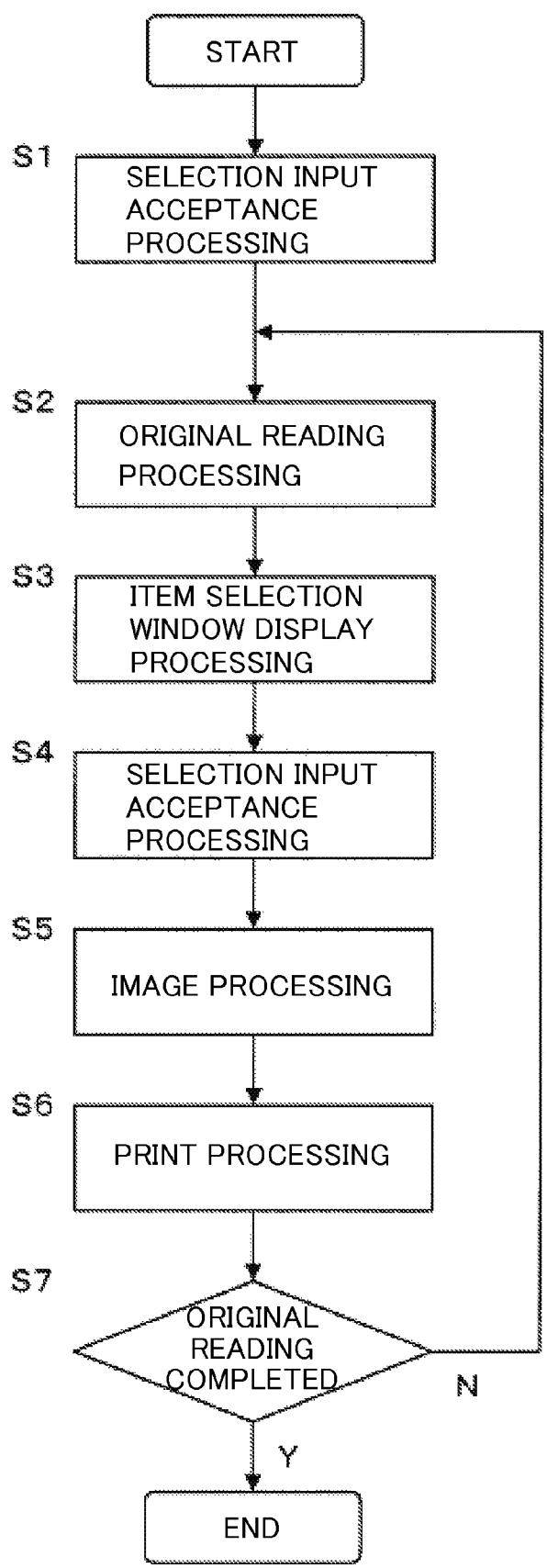
FIG. 5 is a flow chart describing operation of the image reading control device.

Next, operation of the image reading control device is briefly described with reference to a flow chart of FIG. 5.

An example of selecting color, negative image, and image density is described hereinafter.

In Step S1, the display panel unit 7e displays the item selection window 7f as shown in FIG. 4A (item selection window display processing). More specifically, the display panel unit 7e displays a list of buttons such as "color", "negative image", "image density", "mirror image", "combine", "zoom", and "border erase".

Thereafter, a user performs a touch operation on the color button, the negative image button and the image density button on the display panel unit 7e and presses to operate the start key 7c. As a result, the selection is confirmed and the selection information is stored in advance in the storage unit 5 via the main control unit 1 (selection input acceptance processing).

In the subsequent Step S2, the user sets the original 13 on the original tray 43 of the automatic original feeder 39 and provides an instruction to start reading by touching the start key 7c of the operation panel unit 7.

As a result, in the image forming apparatus A, the rollers 47 dispatch the original 13 from the original tray 43, feed the original 13 in a looped manner, and eject the original 13 to the ejected paper tray 45 under control of the reading control unit 49. The original reading unit 3 (the reading unit 27, the reading portion 37) optically reads the surface image of the original page by page, obtains (generates) electrical image data, and stores the image data to the storage unit 5 (original reading processing).

In Step S3, the display panel unit 7e displays the processing condition setting window 7j as shown in FIG. 4B (processing condition setting window display processing). More specifically, the display panel unit 7e displays a preview window 7h based on the image data for each page thus read, the selected processing items, and a setting window 7i for setting contents for each of the selected processing items. The processing then advances to Step S4.

In Step S4, the user sets contents of a processing condition for the image shown on the preview window 7h in the processing condition setting window 7j.

As a result, the image forming apparatus A accepts a setting input for setting the contents for each processing condition for each page shown in the preview window 7h (setting input acceptance processing). The processing then advances to Step S5.

In Step S5, the image processing unit 51 performs image processing on the image data read by the original reading unit 3, page by page based on setting content that is set in the setting input acceptance processing.

In Step S6, the printing unit 9 prints, page by page, based on the image data processed under processing conditions that are respectively set (print processing).

Furthermore, in Step S7, the image forming apparatus A determines whether the last page of the original has already been read (whether reading of original has been completed). In a case in which the last page of the original has been read (Step S7, YES), the processing terminates. In a case in which there is a page left (Step S7, NO), the processing returns to Step S2.

The image forming apparatus A repeats processing of Steps S2 to S7 until the determination returns YES in Step S7.

Such processing steps constitute an image reading method and image data processing method.

According to the present embodiment, the image forming apparatus A is configured to be able to set a processing condition for each page of the original.

In addition, according to the present embodiment, the image forming apparatus A displays the preview image of an image of a page of the original, the processing item, and the content of the processing item in the same window.

As a result, the image forming apparatus A is configured such that a user can set processing conditions while previewing content of the original (image).

In addition, the image forming apparatus A is configured such that processing conditions for each page can be easily set.

In addition, according to the present embodiment, the image forming apparatus A is configured such that the reading control unit 49 controls the original reading unit 3 to read a subsequent page by outputting the reading instruction to the original reading unit 3, upon acceptance (confirmation) of setting of contents of the processing item regarding the image data for each page through the operation panel 7 (display panel unit 7e). Since the image forming apparatus A can set different processing conditions for each reading operation and can set contents of a processing item after confirming the preview image 7h after the reading operation, an image can be processed and printed, page by page, as desired by a user. As a result, the image forming apparatus A is configured such that a user can set processing conditions (contents) while previewing the image, page by page.

In addition, according to the present embodiment, the image forming apparatus A is configured to be able to display the preview image 7h by focusing on a small number of processing items beforehand, by selecting processing items to be set before the reading operation, thereby enabling display of a large preview image in the display panel 7e with limited space.

Furthermore, according to the present embodiment, the image forming apparatus A can process a similar original with the same setting without repeating the setting, by storing the setting information to the storage unit 5.

A multifunction peripheral has been exemplified as the image forming apparatus (image reading control device) in the present embodiment; however, the image forming apparatus is not limited thereto and can be an image reading device, a copy machine, a facsimile machine, and the like.

In the above embodiment, the image forming apparatus (image reading control device) is configured to read a page of the original, make a processing setting for an image, and then read a subsequent page of the original; however, the present disclosure is not limited thereto.

For example, the image forming apparatus (image reading control device) can also be configured to output a reading instruction to control the original reading unit 3 to read surface images of the original once, and, if the setting input is accepted (confirmed), to sequentially display the processing condition setting windows including preview windows (images) and setting windows for each subsequent page.

In this case, the image forming apparatus (image reading control device) performs the original reading processing on surface images of a plurality of pages of an original and performs the display processing to display the preview windows (images) and the setting windows for each subsequent page.

As a result, the image forming apparatus (image reading control device) is configured to allow sequential setting of image processing while previewing the image data of each page, after reading the image data of all the pages of the original once.

In addition, the image forming apparatus (image reading control device) can provide the same effect as the above-described image forming apparatus A.

What is claimed is:

1. An image reading control device comprising: an original reading unit that optically reads an image of an original, page by page, and obtains image data;

a display unit configured to selectively display an item selection window and a processing condition setting window, the item selection window including processing items for the image data for each page and the processing condition setting window including a preview image based on the image data for each page thus read, at least one processing item selected by a user, and contents to be set for each of the at least one processing item;

an input unit that accepts a selection input of the at least one processing item in a state in which the display unit displays the item selection window and accepts a setting input for setting the contents for each of the at least one processing item in a state in which the display unit displays the processing condition setting window;

a reading control unit configured to cause the item selection window to be displayed on the display unit, and to control acceptance of the selection input for the at least one processing item in the input unit, and the reading control unit configured to cause the processing condition setting window to be displayed on the display unit and the at least one processing item accepted by the input unit to be displayed on the processing condition setting window, and to control acceptance of the setting input for setting the contents for each processing item in the input unit; and an image processing unit that performs image processing on the image data obtained by the image reading unit, page by page, based on the contents set by the setting input.

2. The image reading control device according to claim 1, wherein the reading control unit controls to output a reading instruction to control the original reading unit to read an image of a page of the original, and, if the setting input is accepted in the input unit, to output the reading instruction to the original reading unit to read a next page.

3. The image reading control device according to claim 1, wherein the reading control unit controls to output a reading instruction to control the original reading unit to read images of a plurality of pages of the original at one time, and, if the setting input is accepted in the input unit, the reading control unit controls the display unit to sequentially display the processing condition setting window for each subsequent page.

4. An image forming apparatus comprising: an image reading control device including:

an original reading unit that optically reads an image of an original, page by page, and obtains image data;

a display unit configured to selectively display an item selection window and a processing condition setting window, the item selection window including processing items for the image data for each page, and the processing condition setting window including a preview image based on the image data for each page thus read, at least one processing item selected by a user, and contents to be set for each of the at least one processing item;

an input unit that accepts a selection input of the at least one processing item in a state in which the display unit displays the item selection window, and accepts a setting input for setting the contents for each of the at least one processing item in a state in which the display unit displays the processing condition setting window;

a reading control unit configured to cause the item selection window to be displayed on the display unit and to control acceptance of the selection input for the at least one processing item in the input unit, and the reading control unit configured to cause the processing condition setting window to be displayed on the display unit and the at least one processing item accepted by the input unit to be displayed on the processing condition setting window, and to control acceptance of the setting input for setting the contents for each processing item in the input unit; and an image processing unit that performs image processing on the image data obtained by the image reading unit, page by page, based on the contents set by the setting input; and an image forming unit that forms an image based on the image data processed by the image processing unit.

5. The image forming apparatus according to claim 4, wherein the reading control unit controls to output a reading instruction to control the original reading unit to read an image of a page of the original, and, if the setting input is accepted in the input unit, to output the reading instruction to control the original reading unit to read a next page.

6. The image forming apparatus according to claim 4, wherein the reading control unit controls to output a reading instruction to control the original reading unit to read images of a plurality of pages of the original at one time, and, if the setting input is accepted in the input unit, the reading control unit controls the display unit to sequentially display the processing condition setting window for each subsequent page.

7. An image data processing method by which an image forming apparatus processes image data obtained, comprising:

an original reading step in which the image forming apparatus optically reads an image of an original, page by page, and obtains image data;

an item selection window displaying step in which the image forming apparatus causes an item selection window including processing items for the image data for each page to be displayed;

a selection input accepting step in which the image forming apparatus accepts a selection input of at least one processing item from a user in a state of displaying the item selection window;

a processing condition setting window displaying step in which the image forming apparatus causes a processing condition setting window to be displayed, the processing condition setting window including a preview image based on the image data for each page thus read, the at least one processing item selected in the selection input accepting step, and contents to be set for each of the at least one processing item;

a setting input accepting step in which the image forming apparatus accepts a setting input for setting the contents for each of the at least one processing item in a state of displaying the processing condition setting window; and an image processing step in which the image forming apparatus performs image processing on the image data, page by page, based on the contents set in the setting input accepting step.

8. The image data processing method according to claim 7, wherein the image forming apparatus reads an image of a page of the original in the original reading step and, upon acceptance of the setting input in the setting input accepting step, reads a subsequent page.

9. The image data processing method according to claim 7, wherein the image forming apparatus reads images of a plurality of pages of the original at one time in the original reading step, and, if the setting input is accepted in the setting input accepting step, sequentially displays the processing condition setting window for each subsequent page in the processing condition setting window displaying step.

* * * * *